US008515228B2

(12) United States Patent
Rozitis

(10) Patent No.: US 8,515,228 B2
(45) Date of Patent: Aug. 20, 2013

(54) METHOD AND APPARATUS FOR ACCURATELY POSITIONING AN OPTICAL FIBER END

(75) Inventor: Peter A. Rozitis, Midland (CA)

(73) Assignee: Raytheon Canada Limited, Ottawa, Ontario (CA)

( * ) Notice: Subject to any disclaimer, the term of this patent is extended or adjusted under 35 U.S.C. 154(b) by 364 days.

(21) Appl. No.: 12/490,016

(22) Filed: Jun. 23, 2009

(65) Prior Publication Data

US 2010/0322585 A1  Dec. 23, 2010

(51) Int. Cl.
*G02B 6/38* (2006.01)

(52) U.S. Cl.
USPC ............. 385/52; 385/60; 385/72; 385/78

(58) Field of Classification Search
USPC ............................................. 385/52
See application file for complete search history.

(56) References Cited

U.S. PATENT DOCUMENTS

| 4,189,233 | A | * | 2/1980 | Hurt et al. ............... 356/4.02 |
| 4,753,510 | A | * | 6/1988 | Sezerman .................. 385/61 |
| 4,834,488 | A | * | 5/1989 | Lee ........................... 385/57 |
| 5,095,517 | A | * | 3/1992 | Monguzzi et al. ........... 385/90 |
| 5,127,084 | A | * | 6/1992 | Takahashi ................. 385/140 |
| 5,191,629 | A | * | 3/1993 | Kaiser ........................ 385/90 |
| 5,282,393 | A | * | 2/1994 | Arnone et al. .......... 74/490.08 |
| 5,422,725 | A | * | 6/1995 | Vilhelmsson .............. 356/399 |
| 5,606,635 | A | * | 2/1997 | Haake ........................ 385/53 |
| 5,659,645 | A | * | 8/1997 | Satake ....................... 385/33 |
| 5,812,258 | A | * | 9/1998 | Pierson .................... 356/153 |
| 6,068,796 | A | * | 5/2000 | Graham et al. .......... 264/1.28 |
| 6,102,582 | A | * | 8/2000 | Espindola et al. .......... 385/57 |
| 6,232,554 | B1 | * | 5/2001 | Yamazaki et al. ......... 174/653 |
| 6,454,469 | B1 | * | 9/2002 | Hall et al. .................. 385/90 |
| 6,519,941 | B1 | * | 2/2003 | Sanford .................... 60/721 |
| 6,571,041 | B2 | * | 5/2003 | Bourcier et al. ............ 385/52 |
| 6,604,863 | B2 | * | 8/2003 | Trzecieski ................. 385/57 |
| 6,788,855 | B2 | * | 9/2004 | Massey et al. ............. 385/52 |
| 6,879,758 | B2 | * | 4/2005 | Liu et al. ................... 385/52 |
| 6,931,752 | B2 | * | 8/2005 | Tsuda et al. .............. 33/645 |
| 6,935,042 | B2 | * | 8/2005 | Bonham et al. ........... 33/645 |
| 6,940,890 | B2 | * | 9/2005 | Huang et al. ............. 372/107 |
| 6,947,149 | B2 | * | 9/2005 | Kobayashi et al. ........ 356/496 |
| 7,043,118 | B2 | * | 5/2006 | Arimoto et al. ............ 385/31 |
| 7,286,735 | B1 | * | 10/2007 | Burn, III .................. 385/52 |
| 7,321,706 | B2 | * | 1/2008 | Heidemann ............... 385/25 |
| 7,406,227 | B2 | * | 7/2008 | Anderson ................. 385/39 |
| 7,885,500 | B2 | * | 2/2011 | Popp et al. ................ 385/52 |
| 2003/0113069 | A1 | * | 6/2003 | Kim et al. .................. 385/52 |
| 2005/0147347 | A1 | * | 7/2005 | Fluck et al. ............... 385/33 |
| 2006/0093269 | A1 | * | 5/2006 | Willis ........................ 385/52 |
| 2009/0110347 | A1 | * | 4/2009 | Jacobsson ................. 385/16 |

* cited by examiner

*Primary Examiner* — Charlie Peng
(74) *Attorney, Agent, or Firm* — Lando & Anastasi, LLP

(57) ABSTRACT

A method and apparatus involve: yieldably urging movement of a first section relative to a second section in two directions transverse to each other and to a reference axis of the first section, where an optical fiber end portion can be supported on the first section; selectively operating positioning structures that respectively move the first section relative to the second section in the two directions against the yieldable urging. A different method and apparatus involve: selectively operating positioning structure that can move a first section with a reference axis relative to a second section in directions within a plane perpendicular to the axis, that can maintain the first section in a selected position, and that includes plural angularly-offset radial threaded openings in the second section that each have a screw therein with an end engaging the first section, an optical fiber end portion being supported on the first section.

15 Claims, 6 Drawing Sheets

METHOD AND APPARATUS FOR ACCURATELY POSITIONING AN OPTICAL FIBER END

FIELD OF THE INVENTION

This invention relates in general to techniques for aligning an optical fiber with other optics and, more particularly, to techniques for accurately positioning an end of an optical fiber.

BACKGROUND

In fiber optic systems, it is frequently necessary to effect alignment, in relation to other optics, of an optical fiber end that emits or receives radiation. One existing approach is to use three separate, commercially-available devices that are known as "stages" and that can each effect relative movement of two parts parallel to a single direction. The three stages are assembled so that each effects movement of the optical fiber end in a respective one of three orthogonal directions. Although the resulting mechanism with three separate stages has been generally adequate for its intended purpose, it has not been entirely satisfactory in all respects. For example, the size, weight and cost of this type of mechanism are each larger than desirable.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
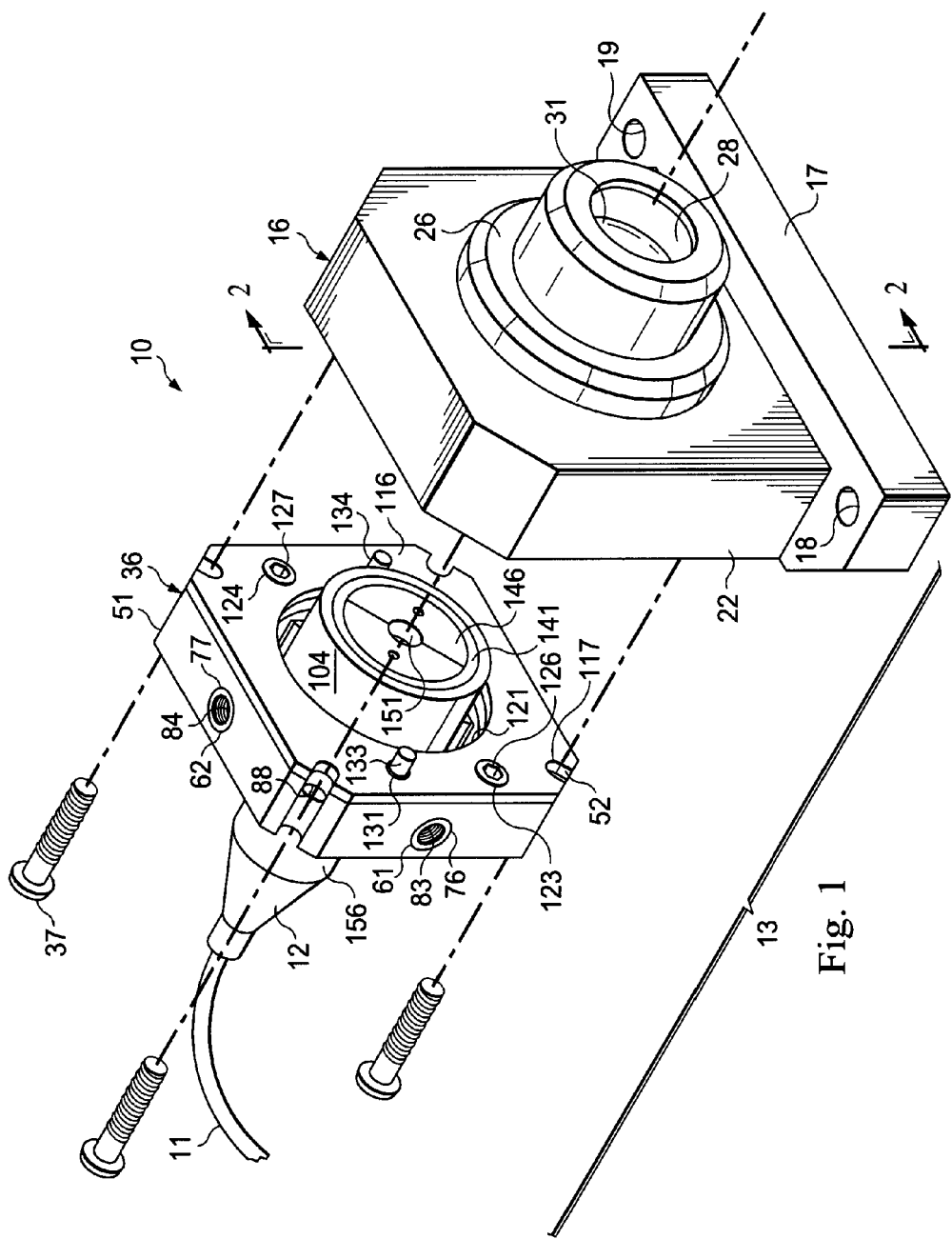
FIG. 1 is a diagrammatic, partially-exploded perspective view of an apparatus that includes aspects of the present invention.

FIG. 1 is a diagrammatic, partially-exploded perspective view of an apparatus 10 that includes aspects of the present invention. The apparatus 10 includes an optical fiber 11 with an optical connector 12 at one end, and a micro-adjuster 13. The optical fiber 11 and connector 12 are conventional, and are therefore not described here in detail. In FIG. 1, the connector 12 is a type of connector known in the art as an FC/APC (angled polished connector). Alternatively, the connector 12 could be a PC (straight polished connector), or any other suitable fiber connector.

Figure 2:
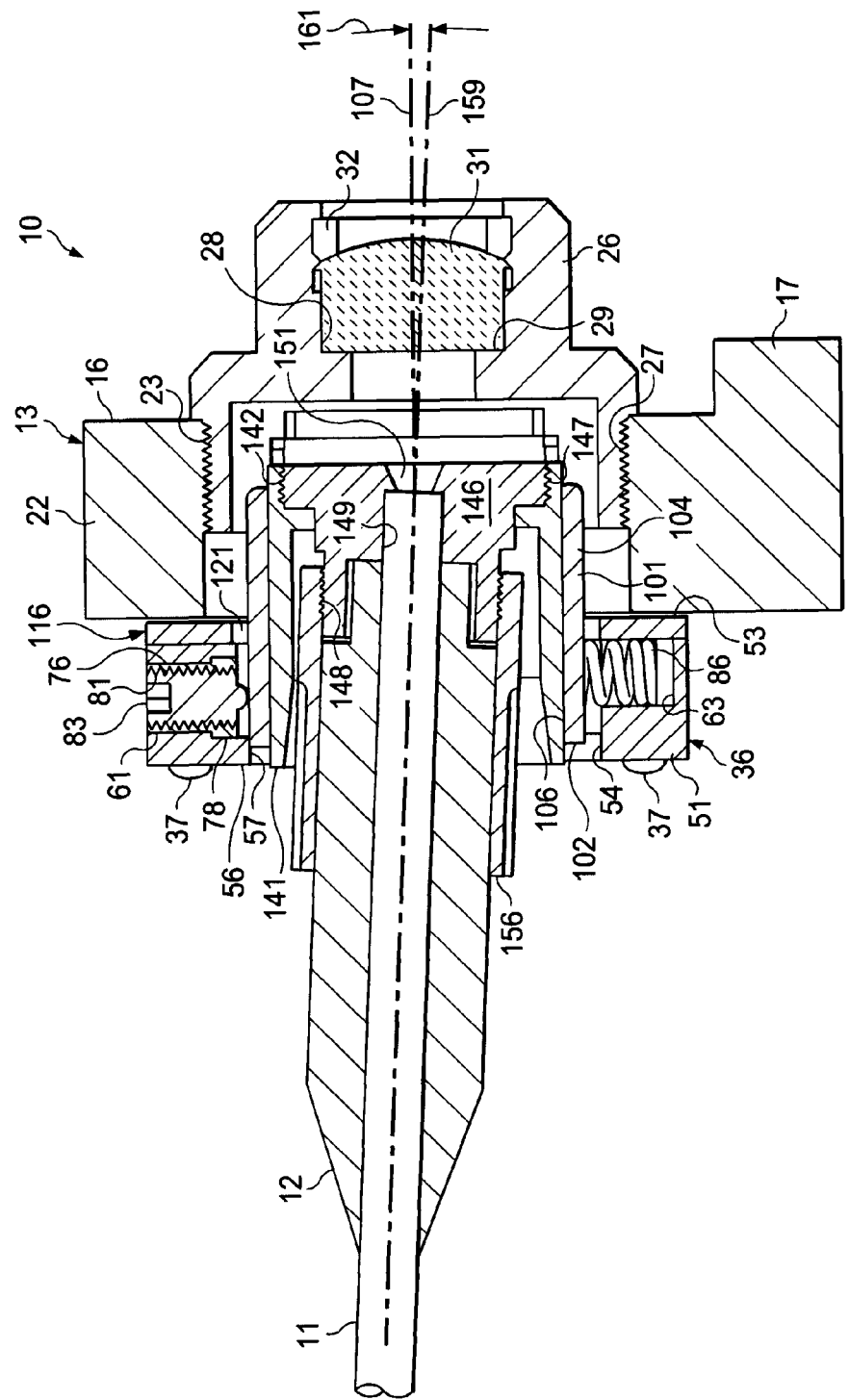
FIG. 2 is a diagrammatic central sectional side view of the apparatus of FIG. 1, taken along the section line 2-2 in FIG. 1.

FIG. 2 is a diagrammatic central sectional side view of the apparatus 10 of FIG. 1, taken along the section line 2-2 in FIG. 1. With reference to FIGS. 1 and 2, the micro-adjuster 13 includes an optional bracket 16 that is made of aluminum, but that could alternatively be made of any other suitable material. The bracket 16 has a horizontal base plate 17 with cylindrical holes 18 and 19 extending vertically therethrough near opposite ends thereof. The bracket 16 also has a vertical plate 22 that extends upwardly from the base plate 17 between the holes 18 and 19. The vertical plate 22 has a threaded cylindrical opening 23 extending horizontally through a central region thereof.

The micro-adjuster 13 includes an optional lens support 26 that is made of aluminum, but that could alternatively be made of any other suitable material. The lens support 26 has a cylindrical end with external threads 27 that engage the threads in the opening 23 through plate 22. Alternatively, the cooperating threads could be omitted from the lens support 26 and the plate 22, and the lens support could be affixed to the plate in any other suitable manner, for example by a friction fit and/or a suitable assembly adhesive. The lens support 26 has an approximately cylindrical opening 28 extending horizontally and axially therethrough. The opening has portions of different diameter, thereby defining an axially-facing annular shoulder 29. An optical lens 31 of a known type is disposed within the opening 28, with one end of the lens disposed against the shoulder 29. A retainer ring 32 is held by a snap fit within the opening 28 near one end thereof, the lens 31 being held against axial movement by the shoulder 29 and the ring 32.

The micro-adjuster 13 includes an adjuster assembly 36 that is fixedly secured to the rear side of the vertical plate 22 by four screws 37. The plate 22 has four threaded openings that are not visible in the drawings, and that each receive the threaded shank of a respective one of the screws 37.

Figure 3:
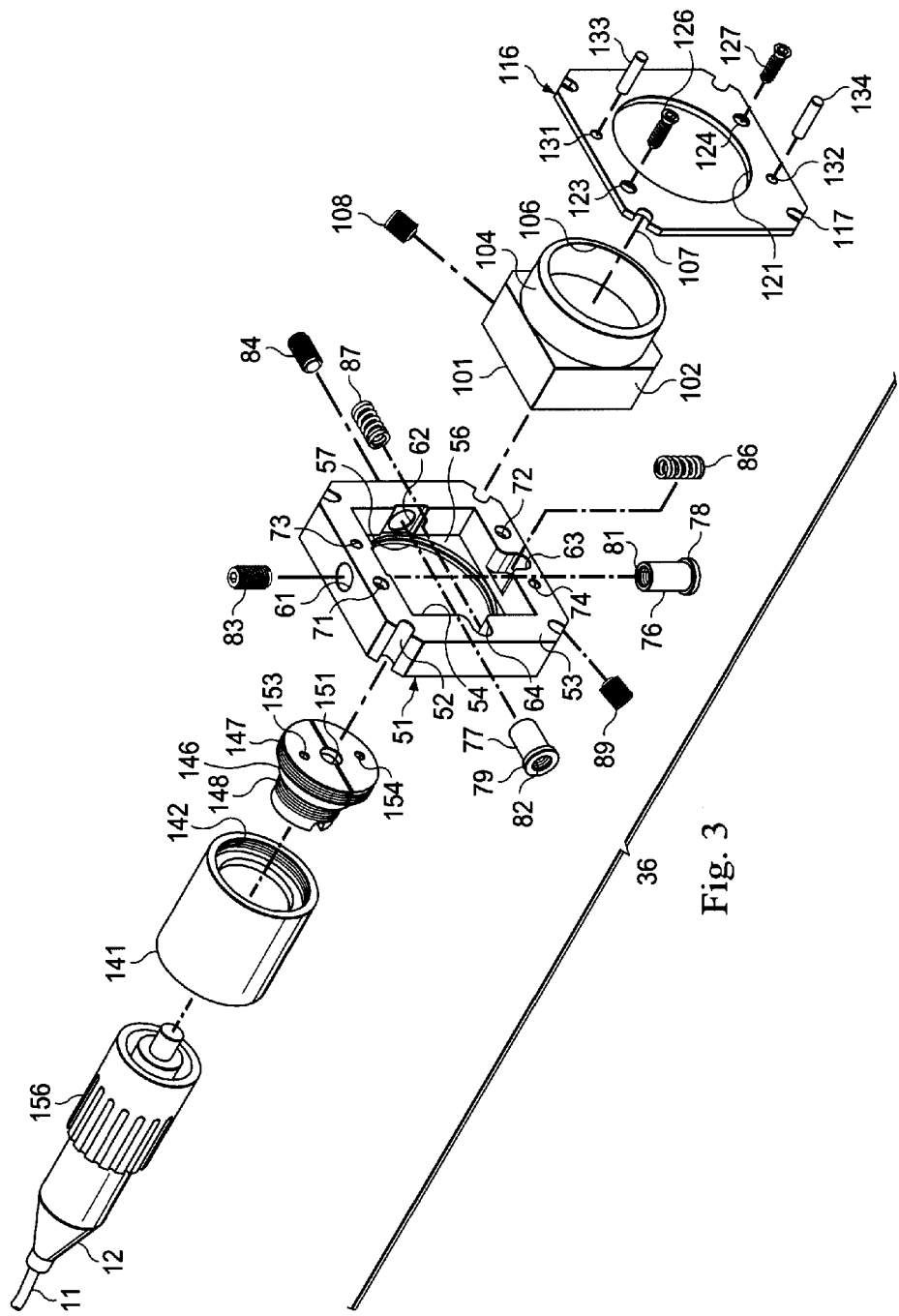
FIG. 3 is a diagrammatic perspective exploded view showing selected portions of the apparatus of FIGS. 1 and 2, including an optical fiber with a connector, and an adjuster assembly.

FIG. 3 is a diagrammatic perspective exploded view showing selected portions of the apparatus 10 of FIGS. 1 and 2, including the fiber 11, connector 12 and adjuster assembly 36. As best seen in FIGS. 2 and 3, the adjuster assembly 36 includes a body 51 that is an approximately square plate with beveled corners. The body 51 is made of stainless steel, but could alternatively be made of aluminum or any other suitable material. Each beveled corner has a semi-cylindrical groove 52 therein, and each of the screws 37 (FIG. 1) has a threaded shank that extends though a respective one of the grooves 52.

The body 51 has a planar front surface 53 on one side thereof. An approximately square recess 54 extends into the body 51 from the front surface 53. The recess 54 extends most but not all of the way through the body 51, thereby leaving a back wall 56 at the rear of the recess, the back wall being an integral part of the body. The back wall 56 has a circular opening 57 extending horizontally therethrough, the diameter of the opening 57 being slightly less than the width and the height of the recess 54.

The body 51 has a cylindrical opening 61 that extends vertically upwardly from the recess 54, and opens through a top surface of the body 51. The body has a further cylindrical opening 62 that extends horizontally outwardly from the recess 54, and opens through a side surface of the body. On a side of the recess 54 opposite from the opening 61, a smaller recess 63 extends into the body 51 from the recess 54. Similarly, on a side of the recess 54 opposite from the opening 62, a smaller recess 64 extends into the body 51 from the recess 54.

Two threaded openings 71 and 72 each extend horizontally into the body 51 from the front surface 53, on opposite sides of the recess 54. In addition, two cylindrical openings 73 and 74 each extend horizontally into the body 51 from the front surface 53, on opposite sides of the recess 54.

A cylindrical insert 76 is disposed in and has a diameter only slightly less than the diameter of the opening 61. The insert 76 has at its lower end an annular, radially-outwardly projecting flange 78 that engages the body 51 and prevents the insert from moving upwardly within the opening 61. A further insert 77 is identical to the insert 76, and has a flange 79. The insert 77 is disposed in the opening 62, and the flange 79 engages the body 51 and prevents the insert 77 from moving outwardly within the opening 62. The inserts 76 and 77 are each held against rotation in the associated opening 61 or 62 by a force-fit. Further, the inserts 76 and 77 can optionally be secured in place by a conventional and commercially-available adhesive, for example a suitable epoxy adhesive. The inserts 76 and 77 have respective threaded cylindrical openings 81 and 82 extending coaxially therethrough. Two setscrews 83 and 84 respectively engage the threaded openings 81 and 82 in the inserts 76 and 77. In the disclosed embodiment, the threads on the setscrews and in the openings 81 and 82 have an extra fine pitch, in order to permit very fine adjustment. However, it would alternatively be possible to use threads with some other pitch. In the disclosed embodiment, the inserts 76 and 77 are each made of stainless steel, but they could alternatively be made of aluminum, or any other suitable material.

Two coil springs 86 and 87 are respectively disposed in the recesses 63 and 64 in the body 51. With reference to FIG. 1, a threaded cylindrical opening 88 extends outwardly through the body 51 from one corner of the square recess 54 to the groove 52 in one corner of the body. With reference to FIG. 3, a setscrew 89 threadedly engages the opening 88.

The adjuster assembly 36 includes a mount 101 that is made of stainless steel, but that could alternatively be made of aluminum, or any other suitable material. The mount 101 has a base 102 with the shape of an approximately square plate. The base 102 is disposed within the recess 54 in the body 51, and has vertical and horizontal dimensions that are less than the vertical and horizontal dimensions of the recess 54, so that the base 102 can move vertically and horizontally within the recess 54. The base 102 has a thickness that is only slightly less than the depth of the recess 54. The inner end of spring 86 engages the bottom of the base 102, and urges the base upwardly against the inner end of setscrew 83. Similarly, the inner end of spring 87 urges the base 102 horizontally against the inner end of setscrew 84.

The mount 101 has a cylindrical projection 104 that extends horizontally forwardly from the base 102. The projection 104 has an outside diameter that is substantially equal to the vertical and horizontal dimensions of the base 102. A cylindrical opening 106 extends completely through the mount 101, coaxial with the cylindrical projection 104. The mount 101 has a reference axis 107 that is coaxial with the cylindrical projection 104 and the cylindrical opening 106. When the optical fiber 11 is releasably coupled to the adjuster assembly 36 by the connector 12, the optical axis of the end of the fiber is coincident with the reference axis 107. The setscrews 83 and 84 and their threaded openings 81 and 82 each extend approximately radially with respect to the reference axis 107, and the springs 86 and 87 act approximately radially with respect to the reference axis.

The mount 101 has a threaded opening that is not visible in the drawings, but that extends radially outwardly from the cylindrical opening 106 to one corner of the base 102. This threaded opening has a setscrew 108 therein. The body 51 has, between the cylindrical openings 61 and 62, a cylindrical opening that extends outwardly from one corner of the recess 54 to an outer corner of the body 51, and a tool of the type known as an Allen wrench or hex key can be inserted through this opening to engage and rotate the setscrew 108 relative to the mount 101.

The adjuster assembly 36 also includes a square plate 116 that has beveled corners, with a semi-circular recess 117 in each corner. The plate 116 is made of stainless steel, but it could alternatively be made of aluminum of any other suitable material. The plate 116 has a planar rear surface that is disposed against the front surface 53 of the body 51, in a manner so that the semi-circular recesses 117 are each aligned with a respective one of the semi-cylindrical grooves 52. The plate 116 has a circular opening 121 that extends therethrough in a central region thereof. The diameter of the opening 121 is approximately the same as the diameter of the opening 57 in the body 51, and the openings 121 and 57 are substantially coaxially aligned with each other. The cylindrical projection 104 on the mount 101 extends outwardly through the opening 121. The diameter of the opening 121 is larger than the outside diameter of the projection 104, so that the projection 104 can move within the opening 121 as the mount 101 moves within the recess 54.

The plate 116 has two cylindrical holes 123 and 124 that extend therethrough on opposite sides of the opening 121, and that are respectively aligned with the threaded openings 71 and 72 in the body 51. Two screws 126 and 127 each have a threaded shank that extends through a respective one of the openings 123 and 124, and threadedly engages a respective one of the two threaded openings 71 and 72 in the body 51. The screws 126 and 127 thus fixedly secure the plate 116 to the body 51. The plate 116 has two further cylindrical holes 131 and 132 that extend therethrough on opposite sides of the opening 121, and that are each aligned with a respective one of the openings 73 and 74 in the body 51. Two cylindrical alignment pins 133 and 134 each have one end portion that extends through a respective one of the holes 131 and 132, and that extends into a respective one of the openings 73 and 74. These ends of the pins 133 and 134 are fixedly secured within the openings 73 and 74 by a friction fit, and may also optionally be held in place by a suitable, conventional, commercially-available adhesive. As best seen in FIG. 1, the other ends of the pins 133 and 134 each project forwardly beyond the plate 116. When the adjuster assembly 36 is secured to the bracket 16 by the screws 37, these ends of the pins 133 and 134 extend into respective, not-illustrated openings in the vertical plate 22 of the bracket 16, in order ensure accurate alignment of the adjusting assembly 36 with respect to the bracket 16.

With reference to FIG. 3, the body 51 and the plate 116 keep the base 102 of the mount 101 captive within the recess 54 of the body, while permitting the previously-discussed movement of the base 102 within the recess. In particular, the mount 101 cannot move any significant distance forwardly or rearwardly with respect to the body 51 in directions parallel to the reference axis 107, but is capable of limited movement with respect to the body in vertical and horizontal directions perpendicular to the reference axis 107.

The adjuster assembly 36 includes a tubular barrel 141, and a connector part 146. The barrel 141 and connector part 146 are each made of aluminum, but could alternatively be made of any other suitable material. The barrel 141 is slidably disposed within the cylindrical opening 106 through the mount 101, and has an outside diameter that is only slightly less than the inside diameter of the opening 106. The barrel 141 has a cylindrical opening extending coaxially therethrough, with internal threads 142 at one end.

The connector part 146 has a cylindrical portion at its front end, with external threads 147 that engage the internal threads 142 in the barrel 141. At its rear end, the connector part 146 has a cylindrical portion of smaller diameter that also has external threads 148. As best seen in FIG. 2, a cylindrical opening 149 extends axially into the connector part 146 from the rear. An inwardly-converging frustoconical opening 151 extends from the front surface of the connector part 146 to the inner end of the opening 149. As shown in FIG. 3, the front surface of the connector part 146 has two spaced recesses 153 and 154. A not-illustrated tool can engage the recesses 153 and 154 in order to effect rotation of the connector part 146 relative to the barrel 141.

With reference to FIG. 2, the conventional connector 12 at the end of the optical fiber 11 includes a rotatable sleeve 156 with internal threads at its forward end. The internal threads on the sleeve 156 can engage the external threads 148 on the connector part 146, in order to releasably couple the connector 12 to the adjuster assembly 36. When the connector 12 is releasably coupled to the connector part 146, the end portion of optical fiber 11 extends into the opening 149 in the connector part 146. The connector part 146 is configured so that an optical axis of the end portion of the optical fiber is coincident with the reference axis 107, and so that a fiber axis 159 of the end portion of optical fiber 11 extends at a small acute angle 161 with respect to the reference axis 107 of the mount 101, as defined by the structure of the APC connector 12 used in the disclosed embodiment. However, the connector part 146 could alternatively be configured so that the fiber axis 159 of the optical fiber is substantially coaxial with the reference axis 107, and thus also coaxial with the optical axis of the fiber.

In operation, when the connector 12 on optical fiber 11 is fixedly coupled to the adjuster assembly 36 of the microadjuster 13, the end portion of the optical fiber 11 can be very accurately positioned. With reference to FIG. 3, and as mentioned earlier, the spring 86 yieldably urges the base 102 of mount 101 upwardly against the inner end of the setscrew 83, and the spring 87 yieldably urges the base 102 horizontally against the inner end of the setscrew 84. By rotating the setscrew 83 and/or the setscrew 84, the base 102 of mount 101 can be moved vertically and/or horizontally within the recess 54, in directions perpendicular to the reference axis 107, until the end of the optical fiber 11 has been accurately positioned. The setscrew 89 can then be manually tightened so that the base 102 of mount 101 is effectively captured between the ends of the three setscrews 83, 84 and 89, thereby preventing the base from moving away from either of the setscrews 83 and 84 against the urging of the associated spring 86 or 87.

In order to also position the end of optical fiber 11 in directions parallel to the reference axis 107, the barrel 141 and adapter 146 can be slidably moved within the mount 101. This movement may, for example, be used to achieve focus for radiation entering or exiting the end of the optical fiber 11. When the barrel 141 and thus the end of the optical fiber 11 are in a desired position relative to the mount 101, the setscrew 108 can be tightened so that its inner end snugly engages the exterior surface of the barrel 141, thereby preventing axial movement of the barrel 141 in relation to the mount 101.

Optical radiation traveling rightwardly through the optical fiber 11 as viewed in FIG. 2 can exit the end of the optical fiber along a path of travel that is coincident with the fiber axis 159, and then pass through the lens 31. Alternatively, radiation traveling leftwardly along a path of travel coincident with fiber axis 159, as viewed in FIG. 2, can pass through the lens 31 and then enter the end of the optical fiber 11.

Figure 4:
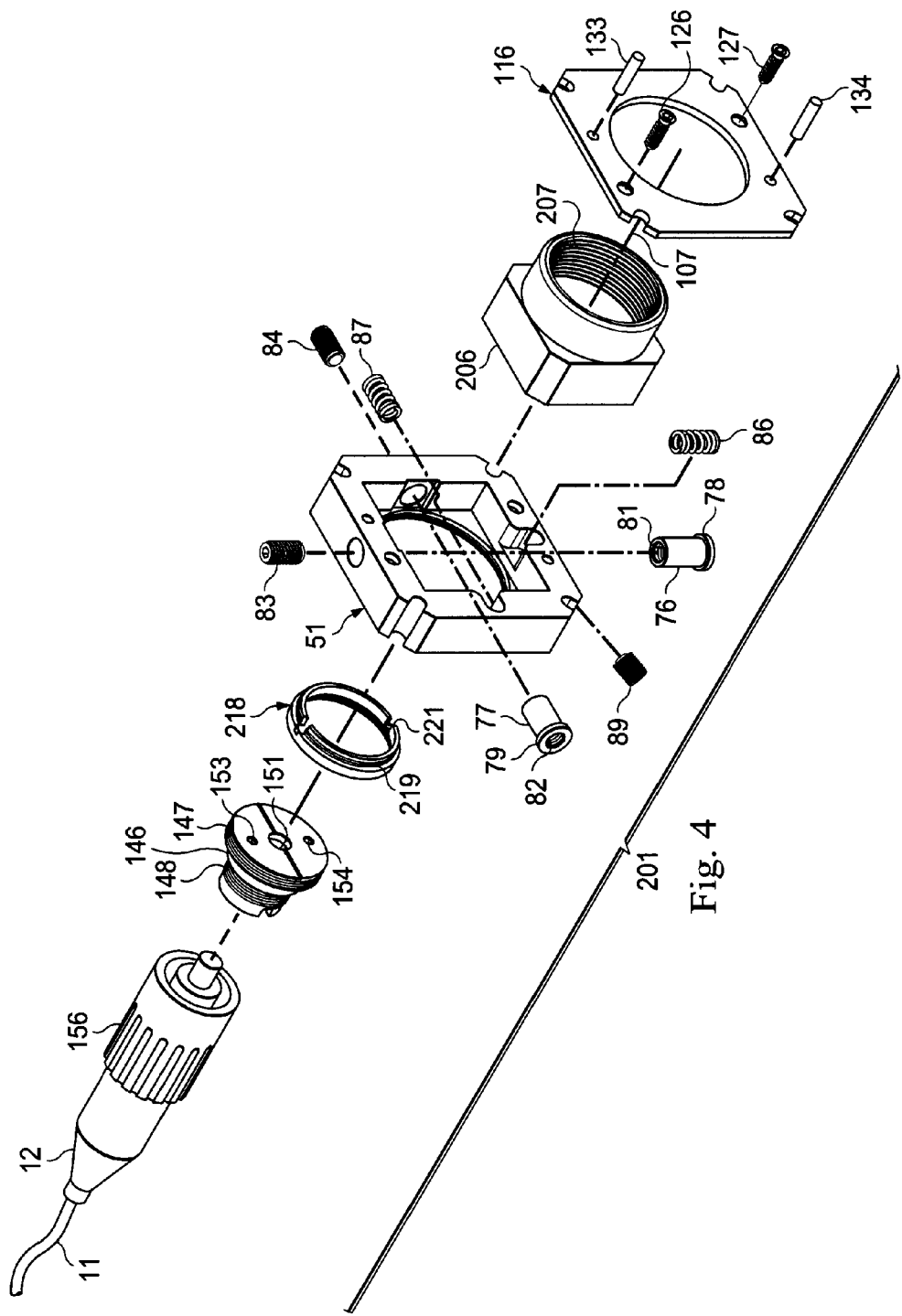
FIG. 4 is diagrammatic perspective exploded view similar to FIG. 3, but showing the optical fiber and connector with an alternative embodiment of the adjuster assembly.

FIG. 4 is diagrammatic perspective exploded view similar to FIG. 3, but showing the optical fiber 11 and connector 12 with an adjuster assembly 201 that is an alternative embodiment of the adjuster assembly 36 of FIG. 3. Components in FIG. 4 that are identical or equivalent to components in FIG. 3 are identified in FIG. 4 with the same reference numerals used in FIG. 3. The adjuster assembly 201 of FIG. 4 is identical to the adjuster assembly 36 of FIG. 3, except for differences that are discussed below.

In FIG. 4, a mount 206 is provided in place of the mount 101 of FIG. 3. The mount 206 is identical to the mount 101, except that the central opening through the mount 206 has internal threads 207 at its forward end. In addition, the mount 206 of FIG. 4 does not include the setscrew 108 (FIG. 3) or the associated threaded opening.

The adjuster assembly 201 of FIG. 4 also does not include the tubular barrel 141 of the adjuster assembly 36 in FIG. 3. In FIG. 4, the external threads 147 at the front end of the connector part 146 directly engage the internal threads 207 provided in the cylindrical opening through the mount 206. The adjuster assembly 201 includes a lock ring 218 with external threads 219 that engage the internal threads 207 in the opening through the mount 206. The front side of the lock ring 218 has two diametrically opposed recesses 221 that can be engaged by a not-illustrated tool, in order to effect rotation of the lock ring 218 relative to the mount 206.

In FIG. 4, the connector part 146 can be rotated relative to the mount 206 and, due to the cooperating threads 147 and 207, the connector part 146 will move axially with respect to the mount 206 in directions parallel to the reference axis 107. This permits the connector part 146 and the end of optical fiber 11 to be positioned relative to the mount 206 in directions parallel to the reference axis 107. After the connector part 146 has been rotated and is in a desired axial position with respect to the mount 206, the lock ring 218 can be rotated until it snugly engages the front side of the connector part 146, so that friction holds the connector part 146 and lock ring 218 against rotation relative to each other or the mount 206.

Figure 5:
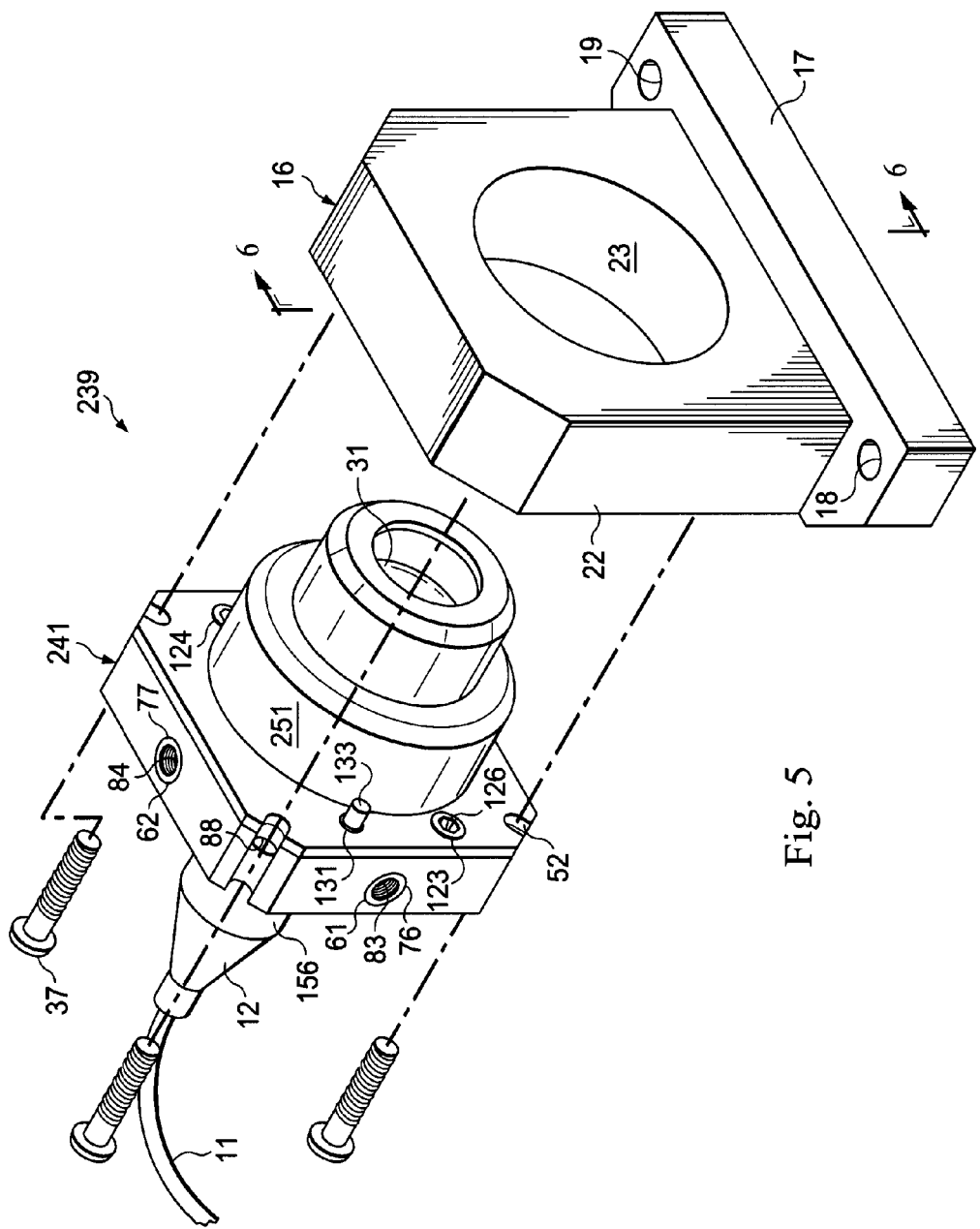
FIG. 5 is a diagrammatic, partially-exploded perspective view similar to FIG. 1, but showing an apparatus that is an alternative embodiment of the apparatus of FIG. 1.
Figure 6:
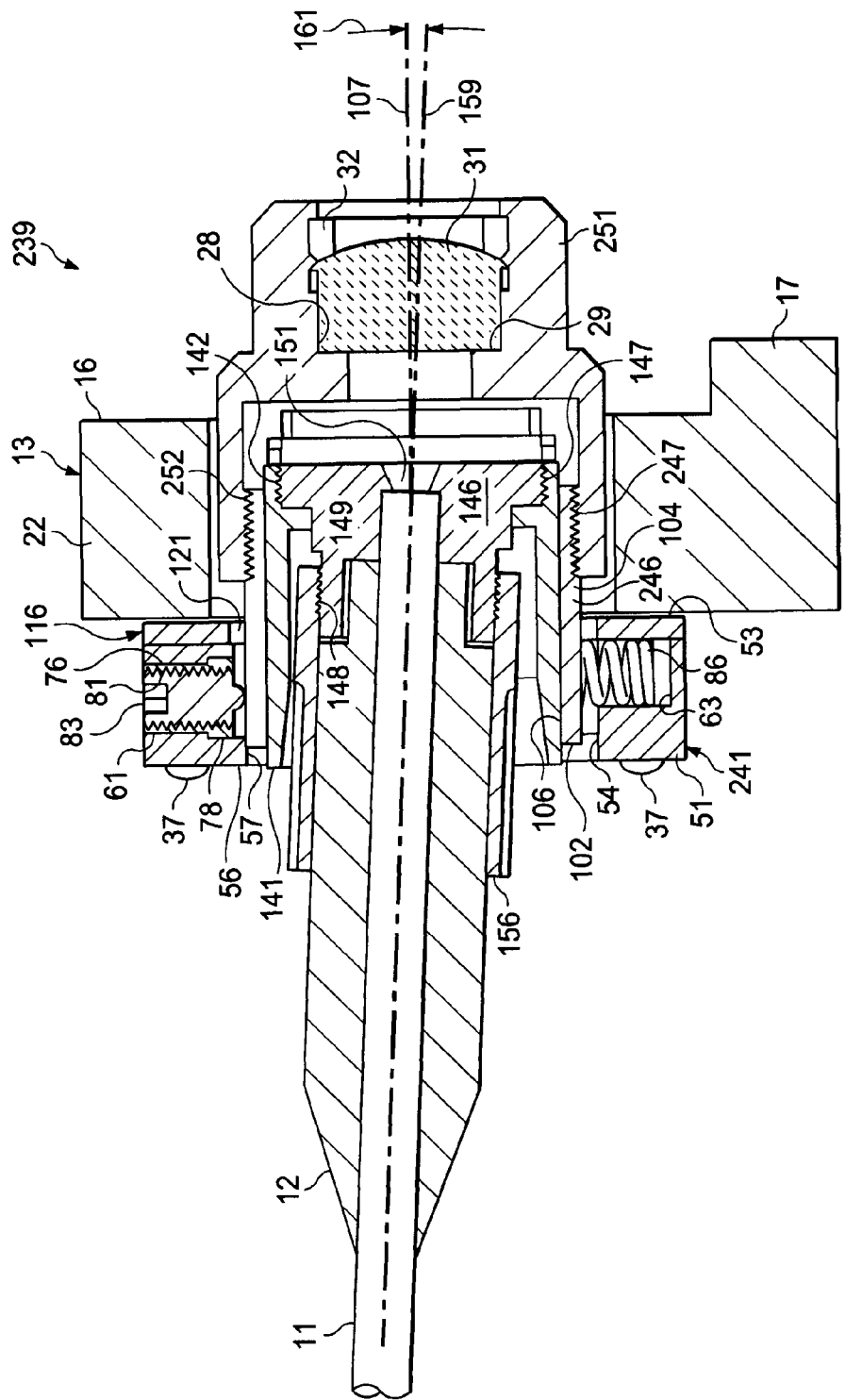
FIG. 6 is a diagrammatic central sectional side view taken along the section line 6-6 in FIG. 5.

FIG. 5 is a diagrammatic, partially-exploded perspective view similar to FIG. 1, but showing an apparatus 239 that is an alternative embodiment of the apparatus 10 of FIG. 1. FIG. 6 is a diagrammatic central sectional side view taken along the section line 6-6 in FIG. 5. Components in FIGS. 5 and 6 that are identical or equivalent to components in FIGS. 1 and 2 are identified in FIGS. 5 and 6 with the same reference numerals used in FIGS. 1 and 2. The apparatus 239 of FIGS. 5 and 6 is identical to the apparatus 10 of FIGS. 1-3, except for differences that are discussed below.

In FIGS. 5 and 6, a mount 246 is provided in place of the mount 101 of FIGS. 1-3. The mount 246 is identical to the mount 101, except that external threads 247 are provided at the front end of the cylindrical projection on the mount 246. In addition, in the apparatus 239 of FIGS. 5-6, a lens support 251 is provided in place of the lens support 26 of FIGS. 1-3. The lens support 251 is supported on the mount 246, whereas the lens support 26 in FIGS. 1-3 is supported on the bracket 16.

In more detail, the rear end of the lens support 251 has internal threads 252 that engage the external threads 247 on the mount 246, thereby fixedly securing the lens support 251 to the mount 246. Alternatively, the cooperating threads could be omitted from the lens support 251 and the mount 246, and the lens support could be affixed to the mount in any other suitable manner, for example by a friction fit and/or a suitable assembly adhesive. The lens 31 is disposed within a central opening through the mount 251, between the shoulder 29 and the retaining ring 32. The largest outside diameter of the lens support 251 is somewhat smaller than the inside diameter of the opening 23 through the bracket 16, so that the lens support 251 can move within the opening 23 as the adjuster assembly 241 positions the optical fiber 11.

Although selected embodiments have been illustrated and described in detail, it should be understood that a variety of substitutions and alterations are possible without departing from the spirit and scope of the present invention, as defined by the claims that follow.

What is claimed is:

1. An apparatus comprising:
an adjuster assembly body;
a mount configured to fit within the adjuster assembly body and movable relative to said adjuster assembly body and having a common reference axis, said mount receiving an optical connector configured to provide fixed support of an optical fiber;
first and second springs that yieldably urge movement of said mount in each of first and second directions relative to said adjuster assembly body, said first direction being transverse to said common reference axis, and said second direction being transverse to each of said first direction and said common reference axis;
a selectively operable first positioning screw for moving said mount relative to said adjuster assembly body against the urging of said first spring; and
a selectively operable second positioning screw for moving said mount relative to said adjuster assembly body against the urging of said second spring;
wherein said optical connector has a tubular barrel and a connector part that is configured to fit within said tubular barrel, which are rotatable relative to each other about said common reference axis, and that have cooperating threads so that relative rotation thereof effects axial movement of said optical connector parallel to said common reference axis in relation to said mount and adjuster assembly body;
wherein said adjuster assembly body includes a threaded first opening that extends approximately perpendicular with respect to said common reference axis, and said first screw threadedly engages said first opening and has an end engaging said mount;
wherein said adjuster assembly body includes a threaded second opening that extends approximately perpendicular with respect to said common reference axis and that is angularly offset about said common reference axis from said first opening, and said second screw that threadedly engages said second opening and has an end engaging said mount;
a first setscrew configured to be selectively operable to engage an inner end of said mount to an exterior surface of said tubular barrel, thereby preventing axial movement of said tubular barrel in relation to said mount;
a second setscrew threadedly engaging a threaded further opening in said adjuster assembly body, and engageable with said mount in a manner so that said second setscrew can press said mount against said ends of said first and second screws;
wherein said first spring is disposed opposite said first positioning screw and said second positioning screw is disposed opposite said second spring; and
wherein said optical connector includes a rotatable sleeve for releasably holding said tubular barrel and said connector part against relative movement, said rotatable sleeve is configured to fit within said tubular barrel.

2. An apparatus according to claim 1, wherein said first and second screws are each a manually-operable setscrew.

3. An apparatus according to claim 1, wherein said first spring yieldably resisting said mount in a third direction opposite said first direction, and said second spring yieldably resisting said mount in a fourth direction opposite said second direction.

4. An apparatus according to claim 3, wherein said mount, said first and second springs and said first and second screws are configured to facilitate a fixed support said optical connector and optical fiber so that a fiber axis thereof extends one of parallel to or at a small angle with respect to said common reference axis.

5. An apparatus according to claim 1, including a lens supported on one of said mount and a bracket, wherein a path of radiation travel associated with said optical fiber extends through said lens.

6. A method of positioning an optical fiber, comprising:
supporting an adjuster assembly body and a mount for relative movement, said adjuster assembly body and said mount having a common reference axis;
fixedly supporting an optical connector including an optical fiber on said mount;
yieldably urging movement of said mount using a first spring in a first direction and using a second spring in a second direction relative to said adjuster assembly body, said first direction being transverse to said common reference axis, and said second direction being transverse to each of said first direction and said common reference axis;
yieldably resisting movement of said mount against said first direction by using a first positioning screw and against said second direction by using a second positioning screw, wherein said first spring is disposed opposite said first positioning screw and said second positioning screw is disposed opposite said second spring;
selectively operating said first positioning screw that moves said mount relative to said adjuster assembly body against said first direction against said yieldable urging;
selectively operating said second positioning screw that moves said mount relative to said adjuster assembly body against said second direction against said yieldable urging; and
configuring said optical connector to include a tubular barrel and a connector part that is configured to fit within said tubular barrel, which are rotatable relative to each other about said common reference axis, and that have cooperating threads so that relative rotation thereof effects axial movement of said tubular barrel parallel to said common reference axis in relation to said connector part;
configuring said optical connector to include a rotatable sleeve for releasably holding said tubular barrel and said connector part against relative movement, said rotatable sleeve is configured to fit within said tubular barrel;
configuring said mount to include a first setscrew configured to be selectively operable to engage an inner end of said mount to an exterior surface of said tubular barrel, thereby preventing axial movement of said tubular barrel in relation to said mount;
configuring said mount to include a second setscrew to threadedly engage a threaded further opening in said adjuster assembly body, and to engage with said mount in a manner so that said second setscrew can press said mount against said ends of said first and second screws;
wherein said yieldably urging movement of said mount results in said first and second positioning screws cooperating with said adjuster assembly body.

7. A method according to claim 6,
including configuring said adjuster assembly body to include a threaded first opening that extends approximately perpendicular with respect to said common reference axis, and said first screw that threadedly engages said first opening and has an end engaging said second section;
including configuring said adjuster assembly body to include a threaded second opening that extends approximately perpendicular with respect to said common reference axis and that is angularly offset about said common reference axis from said first opening, and said second screw that threadedly engages said second opening and has an end engaging said second section;
wherein said selectively operating said first positioning screw includes rotating said first screw; and
wherein said selectively operating said second positioning screw includes rotating said second screw.

8. A method according to claim 6, including supporting a lens on one of said mount and a bracket so that a path of radiation travel associated with said optical fiber extends through said lens.

9. An apparatus comprising:
an adjuster assembly body;
mount configured to fit within the adjuster assembly body having a common reference axis, and being movable relative to said adjuster assembly body in first and second directions that lie within a plane extending approximately normal to said common reference axis, said mount receiving an optical connector configured to provide fixed support of an optical fiber end portion; and
adjuster assembly structure for selectively moving said mount relative to said adjuster assembly body in said first and second directions within said plane, and for maintaining said mount in a selected position relative to said adjuster assembly body,
said adjuster assembly structure, including:
first and second resilient structure that yieldably urge movement of said mount in each of said first and second directions relative to said adjuster assembly body, said first direction being transverse to said common reference axis, and said second direction being transverse to each of said first direction and said common reference axis;
first and second threaded openings in said adjuster assembly body that are angularly spaced about and that each extend in the respective first and second directions, and
first and second screws that each threadedly engage a respective said first and second openings in said adjuster assembly body, said first and second screws each having an end nearest said common reference axis that engages said mount, wherein said first resilient structure is disposed opposite said first screw and said second screw is disposed opposite said second resilient structure;
wherein said optical connector has a tubular barrel and a connector part that is configured to fit within said tubular barrel, which are rotatable relative to each other about said common reference axis, and that have cooperating threads so that relative rotation thereof effects axial movement of said optical connector parallel to said common reference axis in relation to said adjuster assembly structure;
wherein said first and second resilient structure includes first and second springs that each yieldably urge said mount in a respective one of said first and second directions toward a respective one of said first and second screws;
a first setscrew configured to be selectively operable to engage an inner end of said mount to an exterior surface of said tubular barrel, thereby preventing axial movement of said tubular barrel in relation to said mount;
a second setscrew threadedly engaging a threaded further opening in said adjuster assembly body, and engaging said mount in a manner so that said second setscrew can press said mount against said end of each said screw;
wherein said adjuster assembly structure cooperates with said tubular barrel; and
wherein said optical connector includes a rotatable sleeve for releasably holding said tubular barrel and said connector part against relative movement, said rotatable sleeve is configured to fit within said tubular barrel.

10. An apparatus according to claim 9, wherein each of said screws is a manually-operable setscrew.

11. An apparatus according to claim 9, wherein said adjuster assembly structure are configured to facilitate a fixed support of said optical connector and said optical fiber end portion so that a fiber axis thereof extends one of parallel to or at a small angle with respect to said common reference axis.

12. An apparatus according to claim 9, including a lens supported on one of said mount and a bracket, wherein a path of radiation travel associated with said fiber end portion extends through said lens.

13. A method of positioning an optical fiber, comprising:
supporting an adjuster assembly body and a mount for relative movement in first and second directions that lie within a plane extending approximately normal to a common reference axis associated with said mount;
fixedly supporting optical connector including an optical fiber end portion on said mount;
selectively operating adjuster assembly structure that move said mount relative to said adjuster assembly body in said first and second directions within said plane, and that can maintain said mount in a selected position relative to said adjuster assembly body,
said adjuster assembly structure including:
first and second springs that yieldably urge movement of said mount in each of said first and second directions relative to said adjuster assembly body, said first direction being transverse to said common reference axis, and said second direction being transverse to each of said first direction and said common reference axis,
first and second threaded openings in said adjuster assembly body that are angularly spaced about and that each extend in the respective first and second directions, and
first and second screws that each threadedly engage a respective said first and second openings in said adjuster assembly body, said first and second screws each having an end nearest said common reference axis that engages said mount, said selectively operating said adjuster assembly structure including selectively rotating said screws, wherein said first spring is disposed opposite said first screw and said second screw is disposed opposite said second spring; and
configuring said optical connector to include a tubular barrel and a connector part that is configured to fit within said tubular barrel, which are rotatable relative to each other about said common reference axis, and that have cooperating threads so that relative rotation thereof effects axial movement of said tubular barrel parallel to said common reference axis in relation to said connector part;
configuring said optical connector to include a rotatable sleeve for releasably holding said tubular barrel and said connector part against relative movement, said rotatable sleeve is configured to fit within said tubular barrel;

configuring said mount to include a first setscrew configured to be selectively operable to engage an inner end of said mount to an exterior surface of said tubular barrel, thereby preventing axial movement of said tubular barrel in relation to said mount; and configuring said mount to include a second setscrew to threadedly engage a threaded further opening in said adjuster assembly body, and to engage said mount in a manner so that said second setscrew can press said mount against said end of each said screw;

wherein said selectively operating said adjuster assembly structure results in said adjuster assembly structure cooperating with said adjuster assembly body.

14. A method according to claim 13, carrying out said yieldably urging using first and second springs that each yieldably urge said mount in a respective one of said first and second directions.

15. A method according to claim 13, including supporting a lens on one of said mount and a bracket so that a path of radiation travel associated with said fiber end portion extends through said lens.

* * * * *